US010613591B2

(12) United States Patent
Kuo et al.

(10) Patent No.: US 10,613,591 B2
(45) Date of Patent: Apr. 7, 2020

(54) LIFTING DEVICE FOR INPUT ASSEMBLY, AND KEYBOARD AND ELECTRONIC DEVICE THEREOF

(71) Applicant: PEGATRON CORPORATION, Taipei (TW)

(72) Inventors: Yen-Chih Kuo, Taipei (TW);
Hung-Cheng Lee, Taipei (TW);
Tzu-Ming Yang, Taipei (TW);
Cheng-Shi Jiang, Taipei (TW);
Chao-Kai Huang, Taipei (TW);
Jeng-Hong Chiu, Taipei (TW);
Chih-Ming Chen, Taipei (TW);
Chih-Liang Chiang, Taipei (TW)

(73) Assignee: Pegatron Corporation, Taipei (TW)

( * ) Notice: Subject to any disclaimer, the term of this patent is extended or adjusted under 35 U.S.C. 154(b) by 2 days.

(21) Appl. No.: 16/198,186

(22) Filed: Nov. 21, 2018

(65) Prior Publication Data

US 2019/0227601 A1   Jul. 25, 2019

(30) Foreign Application Priority Data

Jan. 24, 2018   (TW) .............................. 107102567 A (51) Int. Cl.
*G06F 1/16*   (2006.01)

(52) U.S. Cl.
CPC .......... *G06F 1/1666* (2013.01); *G06F 1/1664* (2013.01); *G06F 1/1671* (2013.01)

(58) Field of Classification Search
CPC ...... G06F 1/1616; G06F 1/1662; G06F 1/203; G06F 3/0208; G06F 1/1666; G06F 1/1671; G06F 1/1664; G06F 1/16; G06F 1/1681
See application file for complete search history.

(56) References Cited

U.S. PATENT DOCUMENTS 6,771,493 B2 * 8/2004 Chen ..................... G06F 1/1616
                                                    292/95
9,100,470 B2 * 8/2015 Walker .................. G06F 1/1616
(Continued)

FOREIGN PATENT DOCUMENTS

| CN | 101751128 A | * | 6/2010 |
| TW | 587797 U | | 5/2004 |
| TW | 200710901 A | | 3/2007 |

OTHER PUBLICATIONS

CN 101751128 A—Machine Translation (Year: 2019).*

*Primary Examiner* — Jinhee J Lee
*Assistant Examiner* — Ingrid D Wright
(74) *Attorney, Agent, or Firm* — Muncy, Geissler, Olds & Lowe, P.C.

(57) ABSTRACT

A lifting device is applied to an input assembly, and includes: a base, a supporting base, and a connecting rod mechanism, where the base bears the input assembly and includes a lower protruding portion; the supporting base is movably disposed corresponding to the base and includes a base portion and a notch, and the notch is disposed corresponding to the lower protruding portion; the connecting rod mechanism includes an output rod and an input rod, where the output rod is connected to the supporting base; the input rod is linked with the output rod, and drives the output rod to move, so that the supporting base moves relative to the base, and when movement of the supporting base makes the lower protruding portion move from the notch to the base portion, the base ascends by a height.

13 Claims, 12 Drawing Sheets

(56) References Cited

U.S. PATENT DOCUMENTS

| | | | | |
|---|---|---|---|---|
| 9,740,253 B2* | 8/2017 | Cheng | ............... | G06F 1/203 |
| 2015/0034470 A1* | 2/2015 | Kimura | ............ | H01H 13/7065 |
| | | | | 200/5 A |
| 2016/0363962 A1* | 12/2016 | Chiu | ............... | G06F 1/1669 |

* cited by examiner

LIFTING DEVICE FOR INPUT ASSEMBLY, AND KEYBOARD AND ELECTRONIC DEVICE THEREOF

CROSS-REFERENCE TO RELATED APPLICATION

This non-provisional application claims priority under 35 U.S.C. § 119(a) to Patent Application No. 107102567 filed in Taiwan, R.O.C. on Jan. 24, 2018, the entire contents of which are hereby incorporated by reference.

BACKGROUND

Technical Field

The application relates to a keyboard and an electronic device, and in particular, to a keyboard having a height-adjustable input component and an electronic device.

Related Art

A keyboard is an input device of a desktop computer or a notebook computer. Usually, a host of the desktop computer is connected to an external independent keyboard, and the notebook computer is integrated with a built-in keyboard. However, the notebook computer can still be connected to the external independent keyboard as an input device.

When a user operates a computer to play a computer game, for this game, a plurality of specific keys are usually set for special operational uses, to facilitate game playing by the user. For example, in most of first person shooting games, WASD keys are used as instructions for movement of game characters, to control up, left, down, and right movements. To enable a user to quickly find these special function keys, on some keyboards, these special function keys (for example, WASD keys) can emit light or are marked by using different colors for differentiation from other keys on the keyboards. However, in this practice, a user still needs to temporarily move eyes from the display to the keyboard to identify locations of these special function keys. Consequently, the user may be distracted, affecting performance of the user in the game.

Therefore, how to provide a keyboard and an electronic device that enable a user to find a specific input component more easily has become one of important subjects.

SUMMARY

In view of the foregoing subject, the objective of the application is to provide a keyboard having a height-adjustable input component and an electronic device.

To achieve the foregoing objective, a lifting device is provided, applied to an input assembly, and includes: a base, a supporting base, and a connecting rod mechanism, where the base bears the input assembly and includes a lower protruding portion; the supporting base is movably disposed corresponding to the base and includes a base portion and a notch, and the notch is disposed corresponding to the lower protruding portion; the connecting rod mechanism includes an output rod and an input rod, where the output rod is connected to the supporting base; the input rod is linked with the output rod, and drives the output rod to move, so that the supporting base moves relative to the base, and when movement of the supporting base makes the lower protruding portion move from the notch to the base portion, the base ascends by a height.

In an embodiment, the input rod moves along a first direction, the supporting base moves along a second direction, and the first direction and the second direction are in a same plane and are perpendicular to each other.

In an embodiment, the supporting base further includes a protruding portion, where when movement of the supporting base makes the lower protruding portion leave away from the notch, the protruding portion overlaps with an orthogonal projection of the base for the supporting base to support the base.

In an embodiment, the supporting base further includes at least one guide slot, where a slot direction of the guide slot is the same as a movement direction of the supporting base.

In an embodiment, the lifting device further includes at least one fixing component and at least one lifting-lowering guide member. One end of the fixing component passes through the guide slot from one side of the guide slot; the lifting-lowering guide member is mounted on the base and sleeved over the fixing member on the other side of the guide slot, and ascends with the base along an axial direction of the fixing component.

In an embodiment, the lifting device further includes at least one elastic component, sleeved over the lifting-lowering guide member, and compressed along the axial direction of the fixing component when the base ascends.

In an embodiment, a plurality of lifting-lowering guide members and a plurality of elastic members are distributed at different corners of the base in a balanced manner, and a plurality of fixing components pass through a plurality of guide slots.

In an embodiment, the connecting rod mechanism further includes a connection rod, pivotally connected to the output rod and having a first chute, where the input rod has a pivot shaft, and the pivot shaft of the input rod is slidably disposed on the first chute.

In an embodiment, the output rod has a second chute, the supporting base has a pivot shaft, and the pivot shaft of the supporting base is slidably disposed on the second chute of the output rod.

To achieve the foregoing objective, a keyboard is provided, including a first circuit board, the foregoing input assembly, and the foregoing lifting device. The first circuit board has an opening, at least one part of the input assembly through the opening, and the lifting device lifts up the input assembly.

In an embodiment, the input assembly includes a second circuit board and at least one key assembly, where the second circuit board is disposed below the first circuit board, the key assembly is disposed on the second circuit board and passs through the opening, and a profile of the opening conforms to a profile of the key assembly.

In an embodiment, the keyboard further includes a plurality of keys, disposed on the first circuit board, where a cap height of a keycap of the key assembly is greater than a cap height of keycaps of the keys, and when the notch of the supporting base accommodates the lower protruding portion, a height of a keycap top of the key assembly is the same as a height of keycap tops of the keys.

In an embodiment, the input rod is located near a front side of the keyboard, and is configured to be operated by a user.

In an embodiment, the input assembly is a trackball.

In an embodiment, the height of the keys on the first circuit board cannot be adjusted with respect to the height of the first circuit board, and the keys are configured based on a computer standard keyboard.

In an embodiment, the keys and the key assembly are configured based on the computer standard keyboard, the key assembly is WASD keys, and the keys are keys other than the WASD keys.

To achieve the foregoing objective, an electronic device is provided, including a housing and the foregoing keyboard, where the keyboard is disposed on the housing.

In an embodiment, the electronic device is a notebook computer, the housing includes an upper cover, and the upper cover covers the first circuit board, and makes the keys, the input assembly, and the input rod exposed.

In an embodiment, the electronic device is a notebook computer, and further includes a display and a closure descending member, where the display is pivotally disposed on the housing, the closure descending member is disposed on the display, and when the display pivots to a preset angle towards the housing, the closure descending member drives the lifting device to move and descend the input assembly.

In an embodiment, the closure descending member is a magnet, and the lifting device has a magnetic material that magnetically repels the closure descending member.

Based on the above, the keyboard and the electronic device of the application include a height-adjustable input assembly. A user can operate the lifting device to lift up the input assembly, so that the input assembly is higher than other keys, and the user does not need to move eyes to the keyboard, and can correctly find the location of the input assembly by using touch feelings of fingers. During a game application, the user does not need to distract and temperately move eyes from the display to the keyboard, and therefore can concentrate on the game as much as possible.

DETAILED DESCRIPTION OF THE EMBODIMENTS

A keyboard and an electronic device according to preferred embodiments of the application are described below with reference to related drawings, and same components are described by using same reference signs.

Figure 1A:
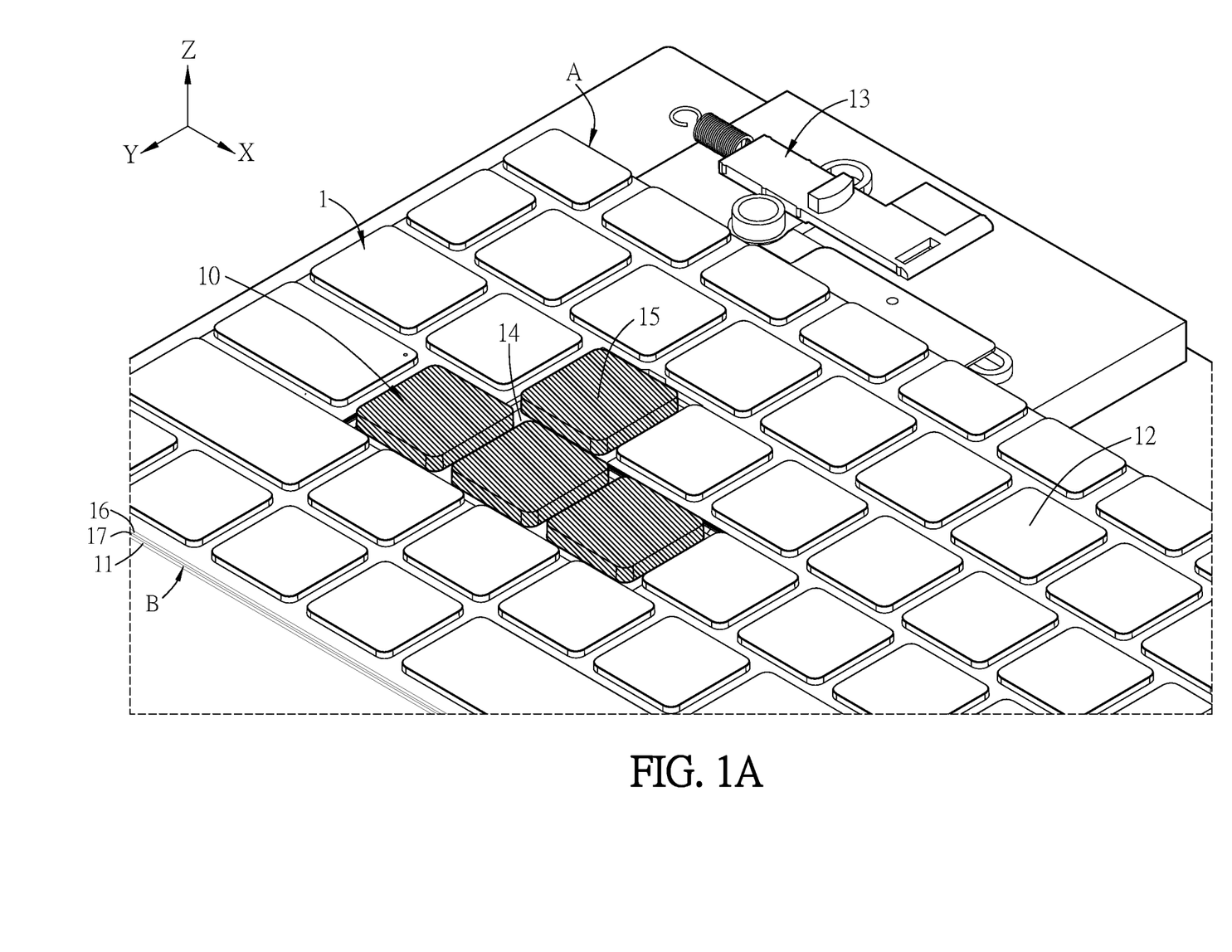
FIG. 1A is a schematic diagram of a keyboard according to an embodiment.
Figure 1B:
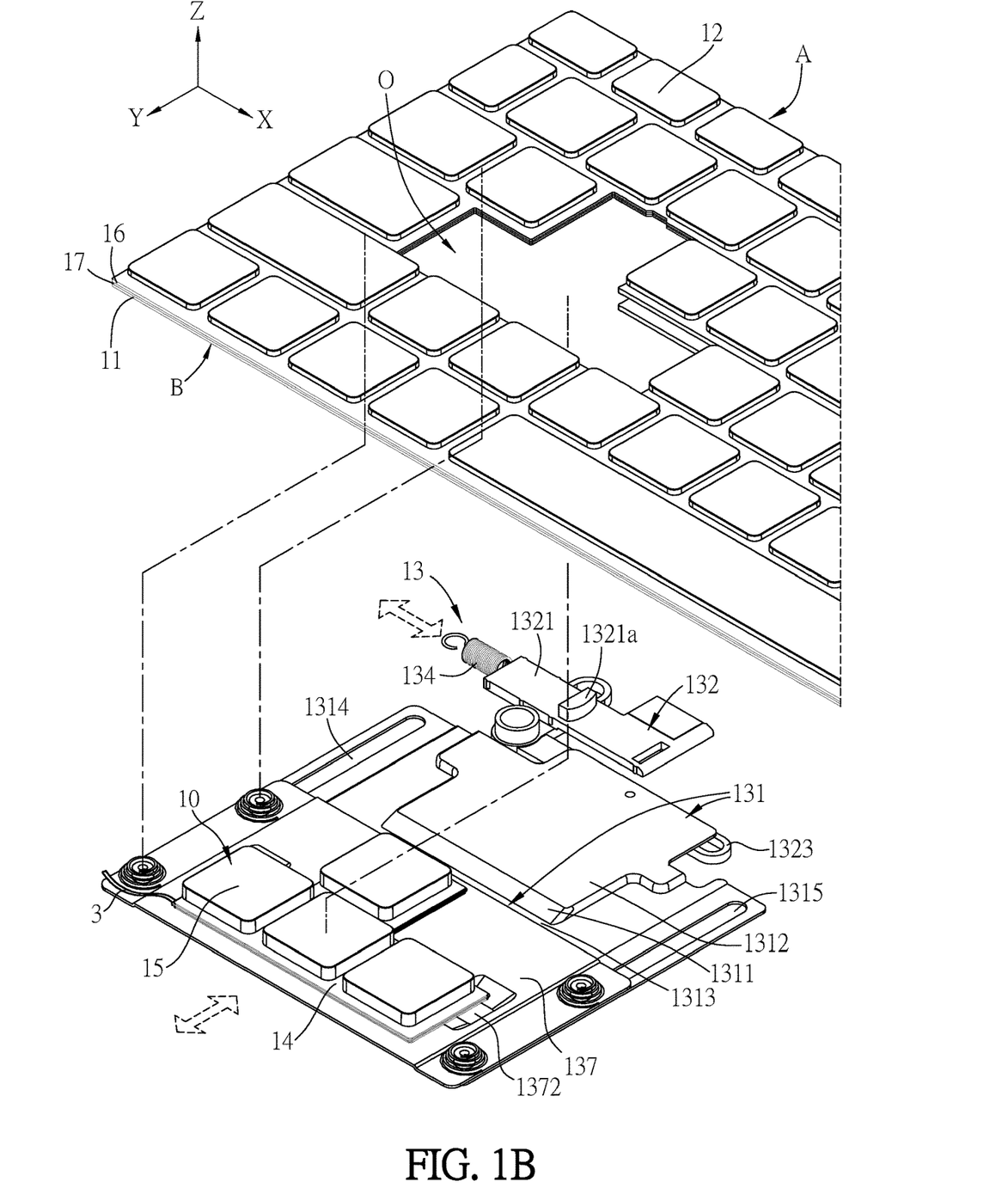
FIG. 1B is a schematic diagram of components of the keyboard in FIG. 1A.
Figure 1C:
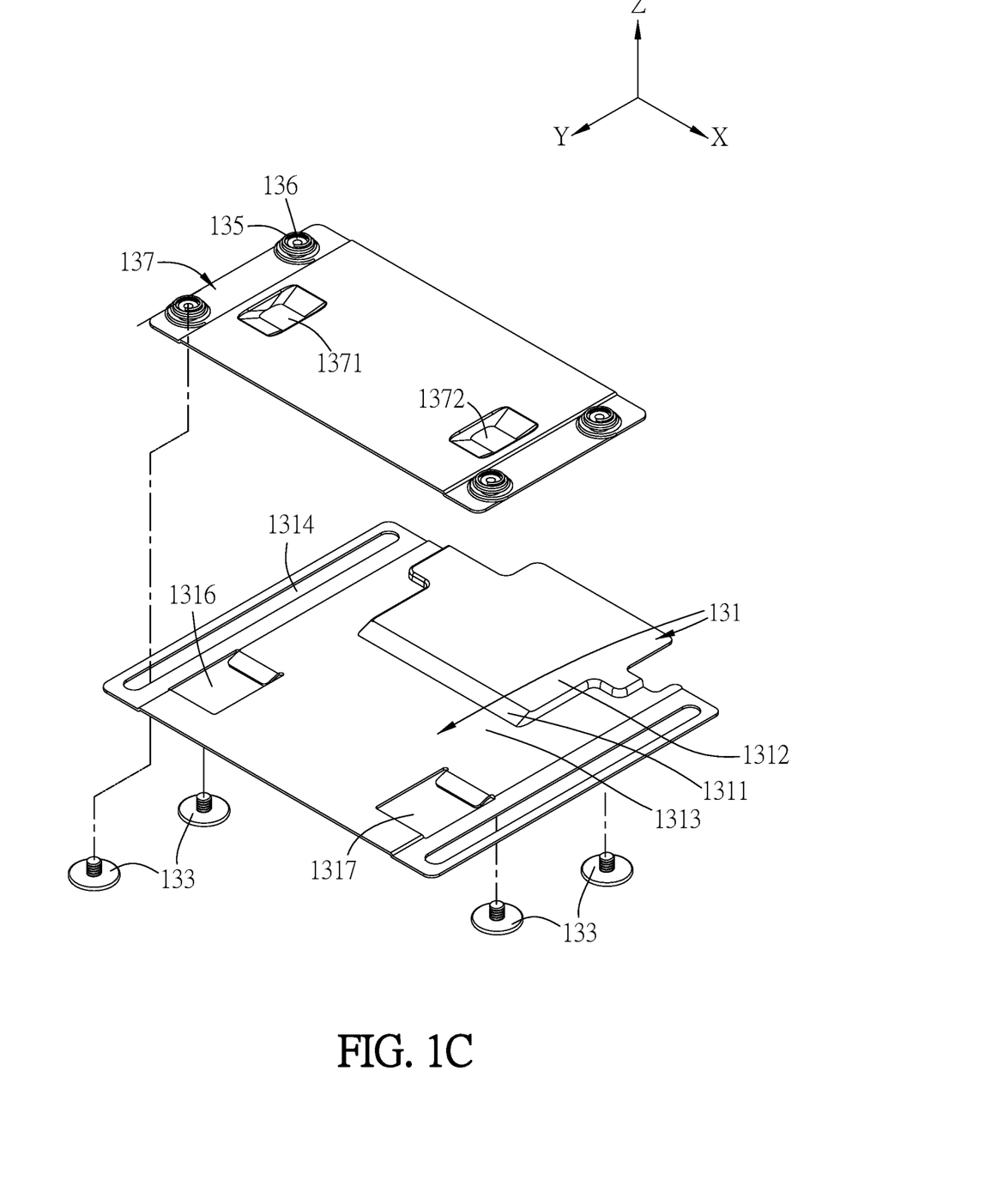
FIG. 1C is a schematic diagram of some of the components in FIG. 1B.

FIG. 1A is a schematic diagram of a keyboard according to an embodiment. FIG. 1B is a schematic diagram of components of the keyboard in FIG. 1A. FIG. 1C is a schematic diagram of some of the components in FIG. 1B. As shown in FIG. 1A to FIG. 1C, a keyboard 1 includes a first circuit board 11, a plurality of keys 12, an input assembly 10, and a lifting device 13. The plurality of keys 12 are disposed on the first circuit board 11. The keys 12 generate an input signal on the first circuit board 11 when being pressed, and transmit the input signal to another component by using the first circuit board 11, for example, to a keyboard controller.

The first circuit board 11 has an opening O, located between at least two keys 12. At least one part of the input assembly 10 passs through the opening O, and generates an input signal. The input signal may be transmitted to another component by using a connection line or the first circuit board 11, for example, to the keyboard controller.

The lifting device 13 is adapted to ascend or descend the input assembly 10, so as to adjust the height of the input assembly 10 relative to the first circuit board 11 or the keys 12. The lifting device 13 includes a base 137, a supporting base 131, and a connecting rod mechanism 132. The base 137 bears the input assembly 10 and includes at least one lower protruding portion, for example, lower protruding portions 1371 and 1372. The supporting base 131 is movably disposed corresponding to the base 137 and includes a base portion 1313 and a protruding portion 1312. The supporting base 131 further includes at least one notch, for example, notches 1316 and 1317. The base portion 1313 is movably disposed below the input assembly 10 and supports the input assembly 10. The notches 1316 and 1317 are disposed corresponding to the lower protruding portions 1371 and 1372. The protruding portion 1312 is higher than the base portion 1313, and is movably disposed below the input assembly 10. In this way, the base portion 1313 or the protruding portion 1312 may be replaced to stably support the input assembly 10. The base portion 1313 can stably support the input assembly 10 at a relatively small height, and the protruding portion 1312 can stably support the input assembly 10 at a relatively large height. The connecting rod mechanism 132 includes an output rod 1323 and an input rod 1321. The output rod 1323 is connected to the supporting base 131. The input rod 1321 is linked with the output rod 1323. The input rod 1321 drives the output rod 1323 to move, so that the supporting base 131 moves relative to the input assembly 10. When movement of the supporting base 131 makes the lower protruding portions 1371 and 1372 move from the notches 1316 and 1317 to the base portion 1313, the base 137 ascends by a height.

In this embodiment, the input rod 1321 may move along a first direction; the supporting base 131 moves along a second direction; the first direction and the second direction are in a same plane, and are perpendicular to each other; the first direction is, for example, a positive axis of the axial direction X in FIG. 1B, and the second direction is, for example, a negative axis of the axial direction Y in FIG. 1B.

In this embodiment, the input assembly 10 includes a second circuit board 14 and at least one key assembly 15; the second circuit board 14 is disposed below the first circuit board 11; the key assembly 15 is disposed on the second circuit board 14 and passs through the opening O, is located between at least two keys 12, and transmits an input signal to another component by using the second circuit board 14, for example, to the keyboard controller. A profile of the opening O conforms to a profile of the key assembly 15, to prevent excessive internal components from being exposed from the opening O, thereby ensuring good appearance, and preventing external foreign matters such as dust from falling into the opening O. The second circuit board 14 may be electrically connected to another component by using an electric wire 3. In FIG. 1B, one end of the electric wire 3 is connected to the second circuit board 14, and the other end of the electric wire 3 may be connected to another component, for example, the keyboard controller.

The keyboard controller of the keyboard 1 processes an input signal generated by the keys 12 or the key assembly 15, then generates a corresponding character based on the input signal, and outputs the character to a connected computer device. The connection manner may be a wired or wireless manner. The computer apparatus is, for example, a desktop computer, a notebook computer, a tablet computer, or a smartphone.

The lifting device 13 is configured to control the second circuit board 14 to move towards or away from the first circuit board 11, to adjust the height of the key assembly 15 relative to the keys 12. The second circuit board 14 is disposed below the first circuit board 11. The cap height of a keycap of the key assembly 15 is greater than the cap height of keycaps of the keys 12. When the notches 1316 and 1317 of the supporting base 131 accommodate the lower protruding portions 1371 and 1372 and the input assembly 10 is located at an original height, the height of the keycap top of the key assembly 15 may be the same as the height of the keycap tops of the keys 12; after the input assembly 10 is lifted up, the key assembly 15 is higher than the keys 12.

Some of components of the lifting device 13 are located near a front side A of the keyboard 1 for operation by a user. The other components of the lifting device 13 are below the input assembly 10, for lifting up the input assembly 10. Some components of the lifting device 13 may move below the input assembly 10 from a front side A to an opposite side B, to adjust the height of the input assembly 10, for example, adjust the height of the input assembly 10 in manners of lifting up, blocking up, or pulling up; otherwise, the input assembly 10 may be restored to the original height.

The height of the keys 12 cannot be adjusted relative to the first circuit board 11, and the keys 12 may be configured based on a computer standard keyboard. In the example in FIG. 1, the key assembly is WASD keys; the keys are keys other than the WASD keys; the keys 12 and the key assembly 15 are configured based on the computer standard keyboard, which conforms to, for example, a 101 keyboard standard.

In addition, the first circuit board 11 may be provided with a shielding member 16 and a spacing layer 17. The spacing layer 17 may be a physical component or an air layer.

The second circuit board 14 may also be provided with a shielding member and a spacing layer.

In addition, the keys 12 may be disposed on the first circuit board 11 in a common key setting manner of a keyboard. The key assembly 15 may be disposed on the second circuit board 14 in a common key setting manner of a keyboard. For example, the keys 12 and the key assembly 15 have keycaps for touch and pressing by a user. A mechanism member under the keycaps can trigger a line of a circuit board to generate an input signal.

The keyboard 1 may be used as an independent keyboard, and may be connected to a computer device such as a desktop computer, a notebook computer, a tablet computer, or a smartphone by using a connection line for use, or may be connected to the computer device such as a desktop computer, a notebook computer, a tablet computer, or a smartphone by using a wireless transmitter for use.

Figure 2A:
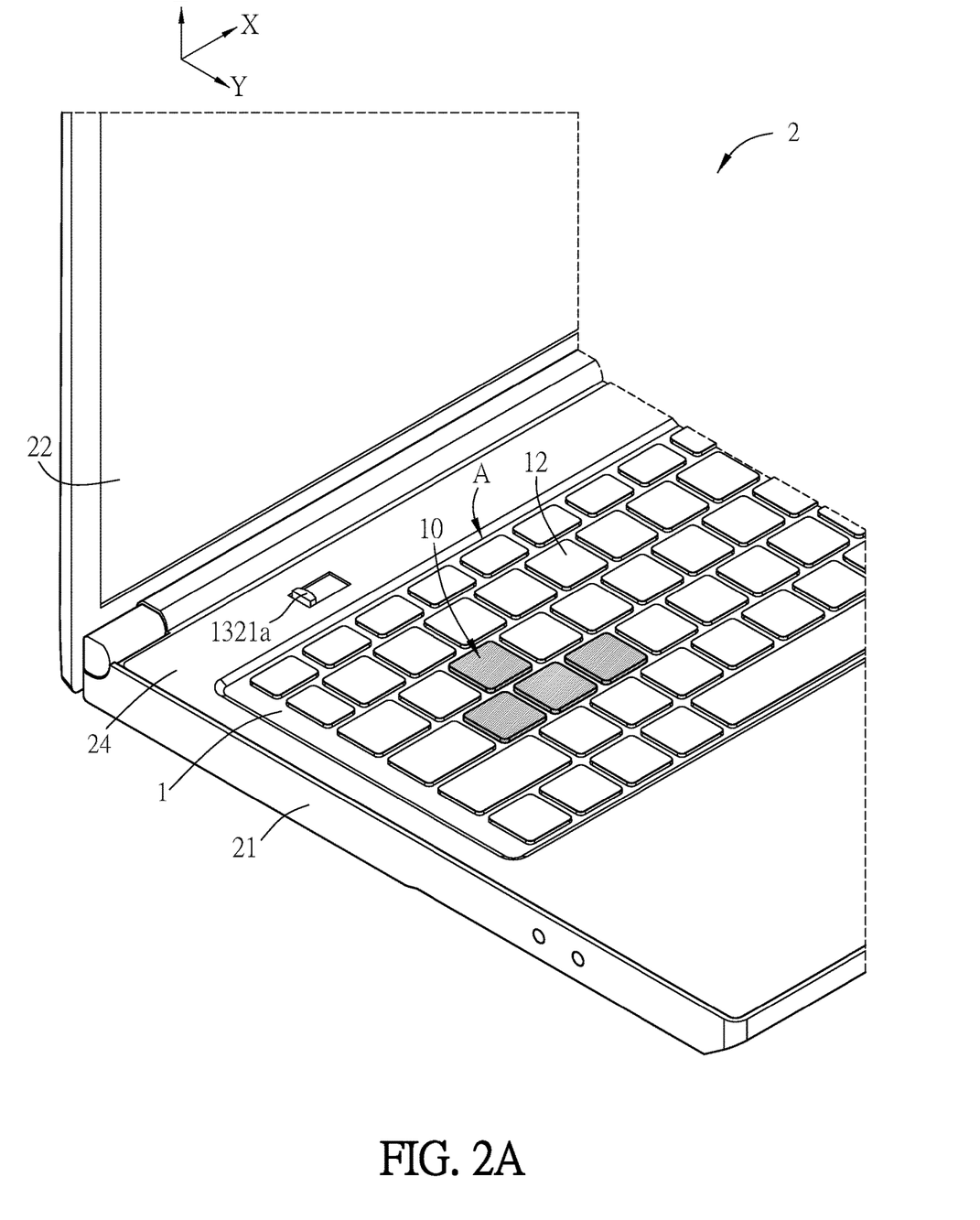
FIG. 2A and FIG. 2B are schematic diagrams of a keyboard and an electronic device according to an embodiment.
Figure 2B:
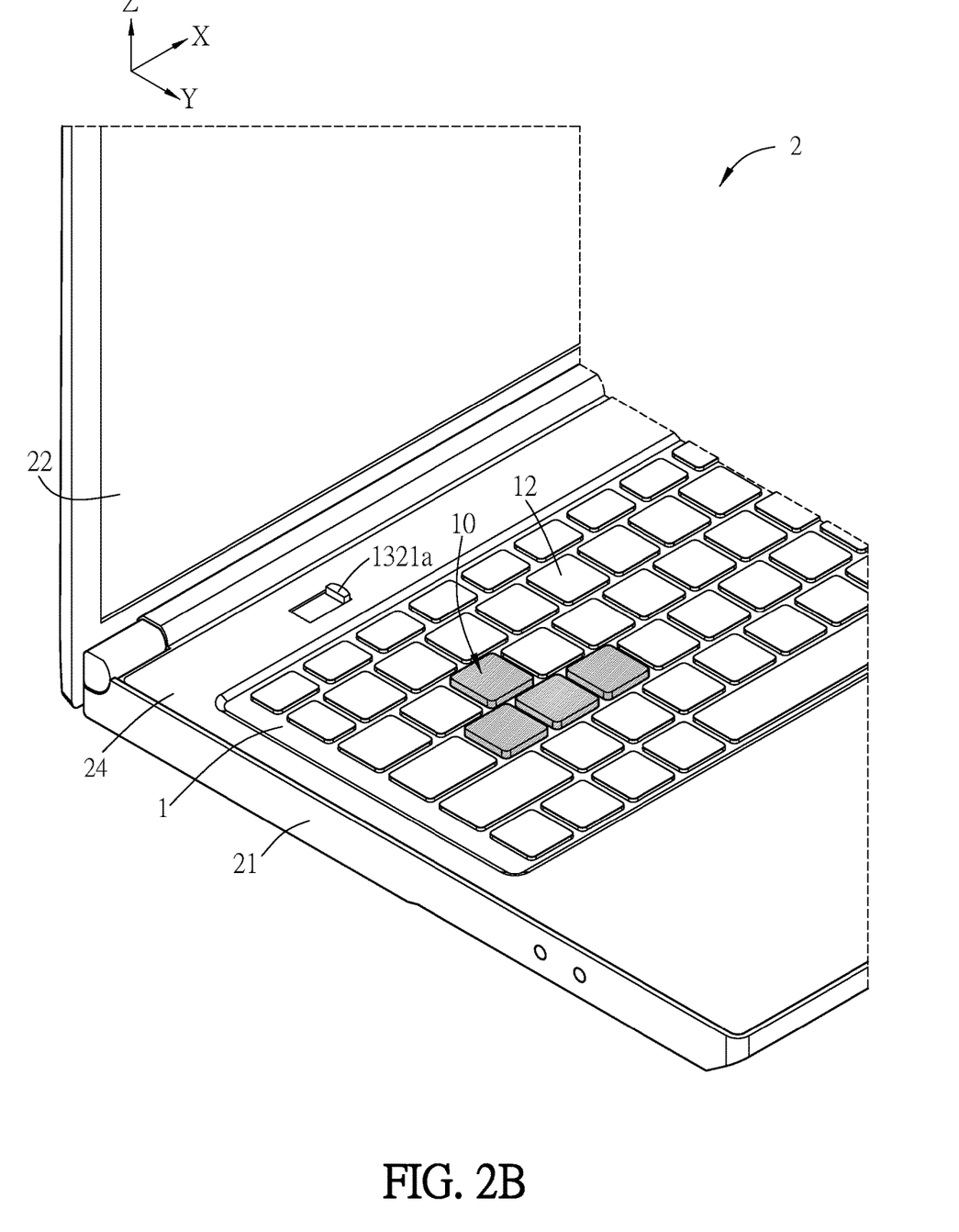

FIG. 2A and FIG. 2B are schematic diagrams of a keyboard and an electronic device according to an embodiment. As shown in FIG. 2A and FIG. 2B, the keyboard 1 of FIG. 1A and FIG. 1B may be built in an electronic device 2, which is, for example, but is not limited to a notebook computer. The electronic device 2 includes a housing 21, a display 22, and an upper cover 24. The keyboard 1 is disposed on the housing 21. The display 22 is pivotally disposed on the housing 21. The upper cover 24 covers the first circuit board 11 of the keyboard 1, and makes the keys 12, the input assembly 10, and the lifting device 13 exposed.

The upper cover 24 also covers most of components of the lifting device 13, and only a protruding block 1321a of the input rod 1321 is exposed from the upper cover 24 to serve as a switching switch, for operation by a user. The lifting device 13 is located near the front side A of the keyboard 1, and is close to a rotation shaft of the electronic device 2 without occupying a narrow side of the electronic device 2. Therefore, an input/output port that should be usually disposed may be disposed on the narrow side of the electronic device 2.

In FIG. 2A, the lifting device 13 is at an initial location, and the input assembly 10 is not lifted up from a first location. In this case, the key assembly 15 is as high as the keys 12, so that the key assembly 12 and the keys 12 still make the user have same touch feelings. In FIG. 2B, the lifting device 13 is at an end location, and the input assembly 10 is lifted up to a second location. In this case, the key assembly 15 is higher than the keys 12, so that the key assembly 12 and the keys 12 make the user have different touch feelings. For example, the key assembly 15 is lifted from the first location to the second location by approximately 1 mm to 1.5 mm, but the actual lifting height is not limited thereto.

Figure 3A:
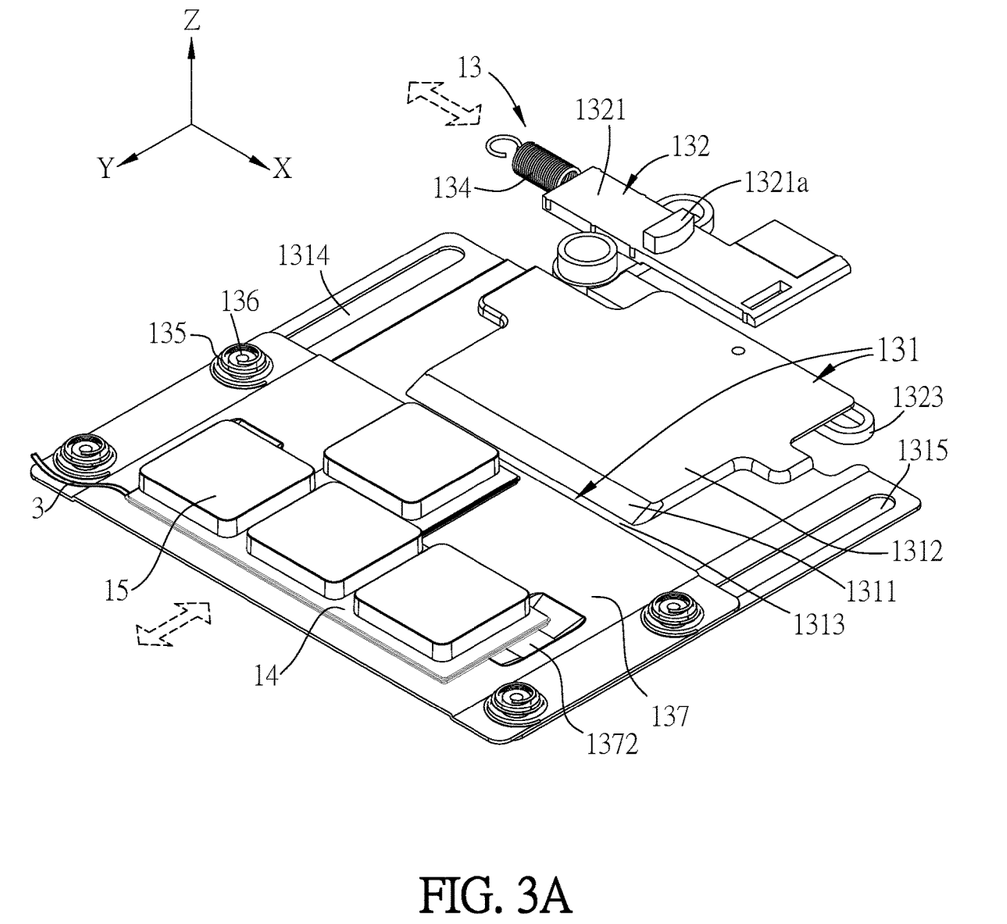
FIG. 3A is a schematic diagram of components of the keyboard in FIG. 2A.
Figure 3B:
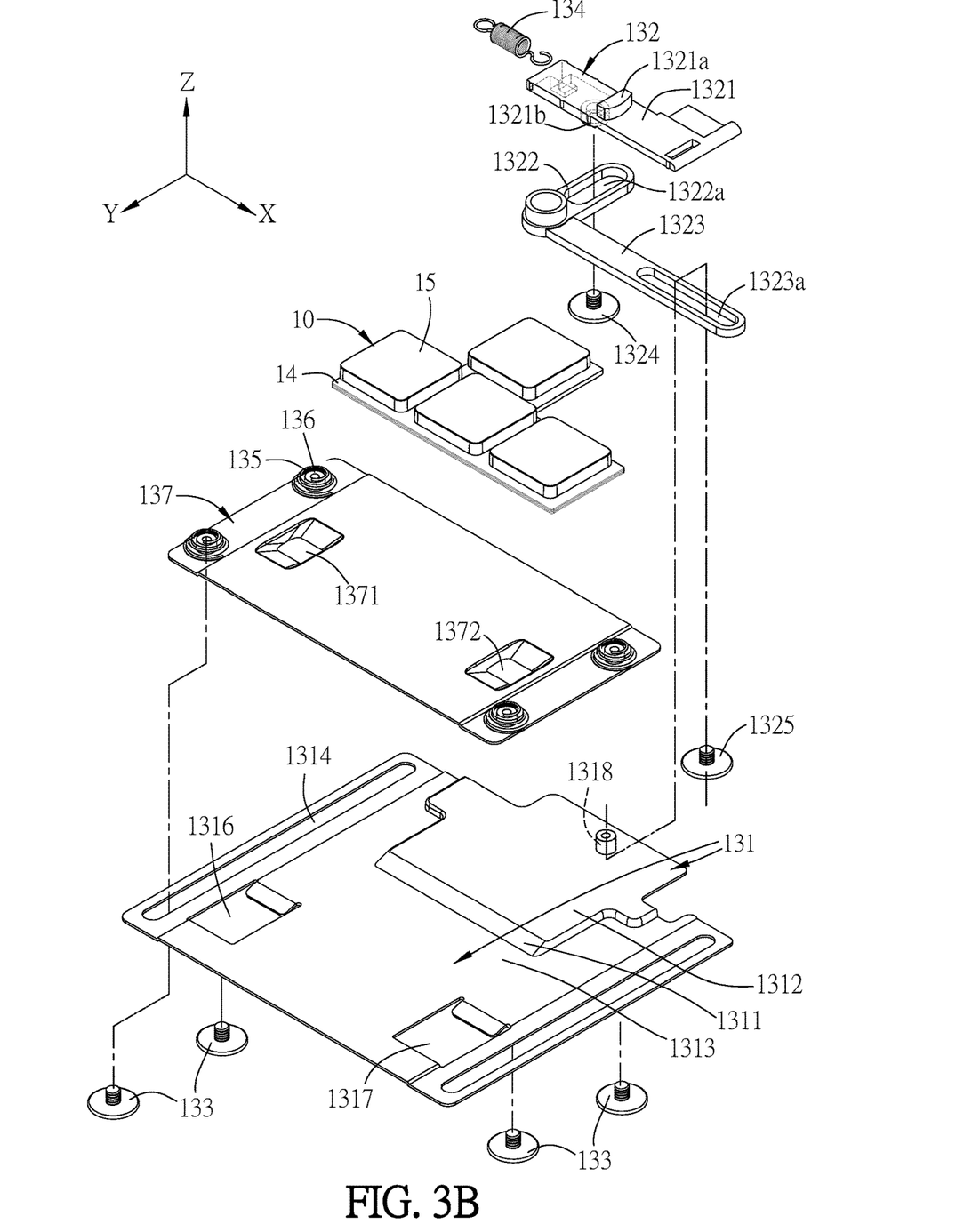
FIG. 3B is a schematic exploded view of FIG. 3A.

FIG. 3A is a schematic diagram of components of the keyboard in FIG. 2A. FIG. 3B is a schematic exploded view of FIG. 3A. The input assembly 10 and the lifting device 13 are described below based on FIG. 3A and FIG. 3B.

As shown in FIG. 3A and FIG. 3B, the input assembly 10 is mounted on the base 137, and the supporting base 131 can slide under the base 137, and keep a distance from the first circuit board 11. In addition, the supporting base 131 further includes a wedge-shaped bevel 1311, located on one side of the protruding portion 1312. When movement of the supporting base 131 moves to make the lower protruding portions 1371 and 1372 leave the notches 1316 and 1317, the protruding portion 1312 overlaps with an orthogonal projection of the base 137 for the supporting base 131, to support the base 137. In detail, when the supporting base 131 moves towards the base 137, the base 137 slides to the protruding portion 1312 along the wedge-shaped bevel 1311, and then the protruding portion 1312 can stably lift up the base 137 and the input assembly 10; the first circuit board 11 in FIG. 1B also compresses an elastic component 135 along an axial direction of the lifting-lowering guide member 136. When the supporting base 131 slides away under the base 137, the base 137 slides down along the wedge-shaped bevel 1311 from the protruding portion 1312 and is descended. Therefore, the input assembly 10 is lifted up or lowered down by means of sliding of the supporting base 131 under the input assembly 10.

The connecting rod mechanism 132 further includes a connection rod 1322. The connection rod 1322 is connected to the input rod 1321 and the output rod 1323. In this embodiment, the connection rod 1322 is pivotally connected to the output rod 1323 and has a first chute 1322a; the input rod 1321 has a pivot shaft 1321b, and the pivot shaft 1321b is slidably disposed on the first chute 1322a. The supporting base 131 has a pivot shaft 1318. The output rod 1323 has a second chute 1323a. The pivot shaft 1318 is slidably disposed on the second chute 1323a. In this embodiment, the number of the connection rod is 1, but the number of connection rods is not limited to 1. In addition, the input rod 1321 may also be directly connected to the output rod 1323, and there is no connection rod therebetween.

The input rod 1321 is located on one side of the keyboard 1, and can slide along an axial direction X. When the input rod 1321 slides along the axial direction X, the input rod 1321 drives, by using the connection rod 1322, the output rod 1323 to move, so that the supporting base 131 moves along the axial direction Y and lifts up the input assembly 10.

If viewed from FIG. 1B, the input assembly 10 is made to be more protruding from the opening O. The supporting base 131 slides under the input assembly 10 along the axial direction Y. Sliding makes the input assembly 10 ascend or descend in the axial direction Z. In this embodiment, the axial direction X is perpendicular to the axial direction Y, the axial direction Y is perpendicular to the axial direction Z, and the axial direction Z is perpendicular to the axial direction X.

A protruding block 1321a of the input rod 1321 is disposed in an open slot of an upper cover 24, and may serve as a switching switch for operation by a user. When the protruding block 1321a is located at an initial location (for example, FIG. 2A), the input assembly 10 is not lifted up from the first location; when the protruding block 1321a is located at an end location (for example, FIG. 2B), the input assembly 10 is lifted up to the second location.

The lifting device 13 may include an elastic member 134. One end of the elastic member 134 is connected to the input rod 1321, and the other end of the elastic member 134 is connected to the upper cover 24 or the housing 21 of the electronic device 2, or another component whose location is fixed relative to the location of the first circuit board 11 and that is in the electronic device 2.

For example, the elastic member 134 is an extension spring. When the input rod 1321 is located at the initial location, the elastic member 134 is not extended; when the input rod 1321 is located at the end location, the elastic member 134 is extended, so that the elastic member 134 keeps elastic potential energy. When the elastic potential energy is released, the input rod 1321 is driven to return to the initial location from the end location. In other examples, the elastic member 134 may alternatively be a compression spring. When the input rod 1321 is located at the initial location, the elastic member 134 is not compressed; when the input rod 1321 is located at the end location, the elastic member 134 is compressed, so that the elastic member 134 keeps elastic potential energy. When the elastic potential energy is released, the input rod 1321 is driven to return to the initial location from the end location.

In this embodiment, a screw 1324 passs through a first chute 1322a of a connection rod 1322 and is locked on a pivot shaft 1321b of the input rod 1321; the output rod 1323 is connected to the supporting base 131 and the connection rod 1322; a screw 1325 passs through a second chute 1323a of the output rod 1323 and is locked on a pivot shaft 1318 of the supporting base 131.

In addition, the supporting base 131 further includes at least one guide slot 1314 or 1315; the lifting device 13 further includes at least one fixing component 133, at least one lifting-lowering guide member 136, and at least one elastic component 135. One end of the fixing component 133 passs through the guide slot 1314 or 1315 from one side of the guide slot 1314 or 1315; the lifting-lowering guide member 136 is mounted on the base 137 and sleeved over the fixing member 133 on the other side of the guide slot 1314 or 1315, and ascends with the base 137 along an axial direction of the fixing component 133. A slot direction of the guide slot 1314 or 1315 and a movement direction of the supporting base 131 are the same, and both are along the axial direction Y. The fixing component 133 may slide in the guide slot 1314 or 1315, so as to limit the base 137 to slide in the axial direction Y only along the guide slot 1314 or 1315. The elastic component 135 is sleeved over the lifting-lowering guide member 136, and compressed along the axial direction of the fixing component 133 when the base 137 ascends.

In this embodiment, a second circuit board 14 of the input assembly 10 is mounted on the base 137. The quantities of the fixing components 133, the elastic components 135, and the lifting-lowering guide members 136 are all four, and the quantity of the guide slots 1314 and 1315 is 2. However, this application is not limited to these quantities. The elastic component 135, for example, is, but is not limited to a conical spring. The lifting-lowering guide member 136 is disposed on the base 137 and faces the first circuit board 11, and limits ascending or descending of the base 137. The elastic component 135 is disposed on the base 137 and is sleeved over the lifting-lowering guide member 136, and is configured to be compressed by the first circuit board 11 along the axial direction of the lifting-lowering guide member 136.

In addition, the lower protruding portions 1371 and 1372 are located beside the second circuit board 14, and the notches 1316 and 1317 are located on the base portion 1313 and are located diagonally forward the wedge-shaped bevel 1311. In this embodiment, the quantity of the lower protruding portions is two, and the quantity of the notches is two, but this application is not limited to these quantities. However, the quantity of the notches is not less than the quantity of the lower protruding portions.

When the supporting base 131 is still at the original location and does not move towards the axial direction Y, the base portion 1313 is under the base 137, the base 137 and the input assembly 10 are stably supported by the base portion 1313, and the input assembly 10 is not lifted up. The lower protruding portions 1371 and 1372 fall within the notches 1316 and 1317, so as to prevent the base 137 and the supporting base 131 from sliding or shaking relative to each other, to fix the location of the input assembly 10. When the wedge-shaped bevel 1311 moves towards the input assembly 10 along the slot direction of the guide slot 1314 or 1315, the lower protruding portions 1371 and 1372 depart from the notches 1316 and 1317 and abut against the base portion 1313, so that the base 137 is lifted up and ascends by a height, and the lifted height, for example, is, but is not limited to 1 mm to 1.5 mm. Then the wedge-shaped bevel 1311 continues to move towards the input assembly 10 along the slot direction of the guide slot 1314 or 1315, and the base 137 slides to the protruding portion 1312 along the wedge-shaped bevel 1311 and is stably lifted up by the supporting base 131. In addition, when the input assembly 10 is lifted up, and the wedge-shaped bevel 1311 slides away under the input assembly 10 along the slot direction of the guide slot 1314 or 1315, the input assembly 10 slides down along the wedge-shaped bevel 1311 from the protruding portion 1312, and the lower protruding portions 1371 and 1372 slide into the notches 1316 and 1317, so that the input assembly 10 is lowered down.

A plurality of lifting-lowering guide members 136 and a plurality of elastic components 135 may be disposed at different corners of the base 137 in a balanced manner. The base 137 may ascend with the axial movement of the lifting-lowering guide member 136. Heads of a plurality of fixing components 133 abut against the guide slot 1314 or 1315, so that the base 137 can be stably jacked up by the lower protruding portions 1371 and 1372, or stably lifted up or lowered down by the wedge-shaped bevel 1311. In addition, to enable the protruding portion 1312 to stably lift up the base 137 and the input assembly 10, the height of the protruding portion 1312 relative to the base portion 1313 is substantively the same as the height of the lower protruding portions 1371 and 1372 relative to the base portion 1313.

Then refer to FIG. 1B. As shown in FIG. 1B, the opening O makes some components of the input assembly 10 exposed, for example, makes the key assembly 15 exposed. The first circuit board 11 still covers an edge of the base 137, to prevent the input assembly 10 from being exposed from the opening O of the first circuit board 11.

The elastic component 135 and the lifting-lowering guide member 136 are located between the first circuit board 11 and the base 137. The elastic component 135 and the lifting-lowering guide member 136 can prevent the input assembly 10 or the second circuit board 14 from abutting against the first circuit board 11.

In addition, the elastic component 135 can help lower down the input assembly 10. When the input assembly 10 is lifted up, a distance between the first circuit board 11 and the base 137 is reduced to compress the elastic component 135 to deform, so that the elastic component 135 stores elastic potential energy, and when the elastic potential energy is released, the base 137 is pushed downwards, so that the input assembly 10 is lowered down and returns to the location at which the input assembly 10 is not lifted up.

Figure 4A:
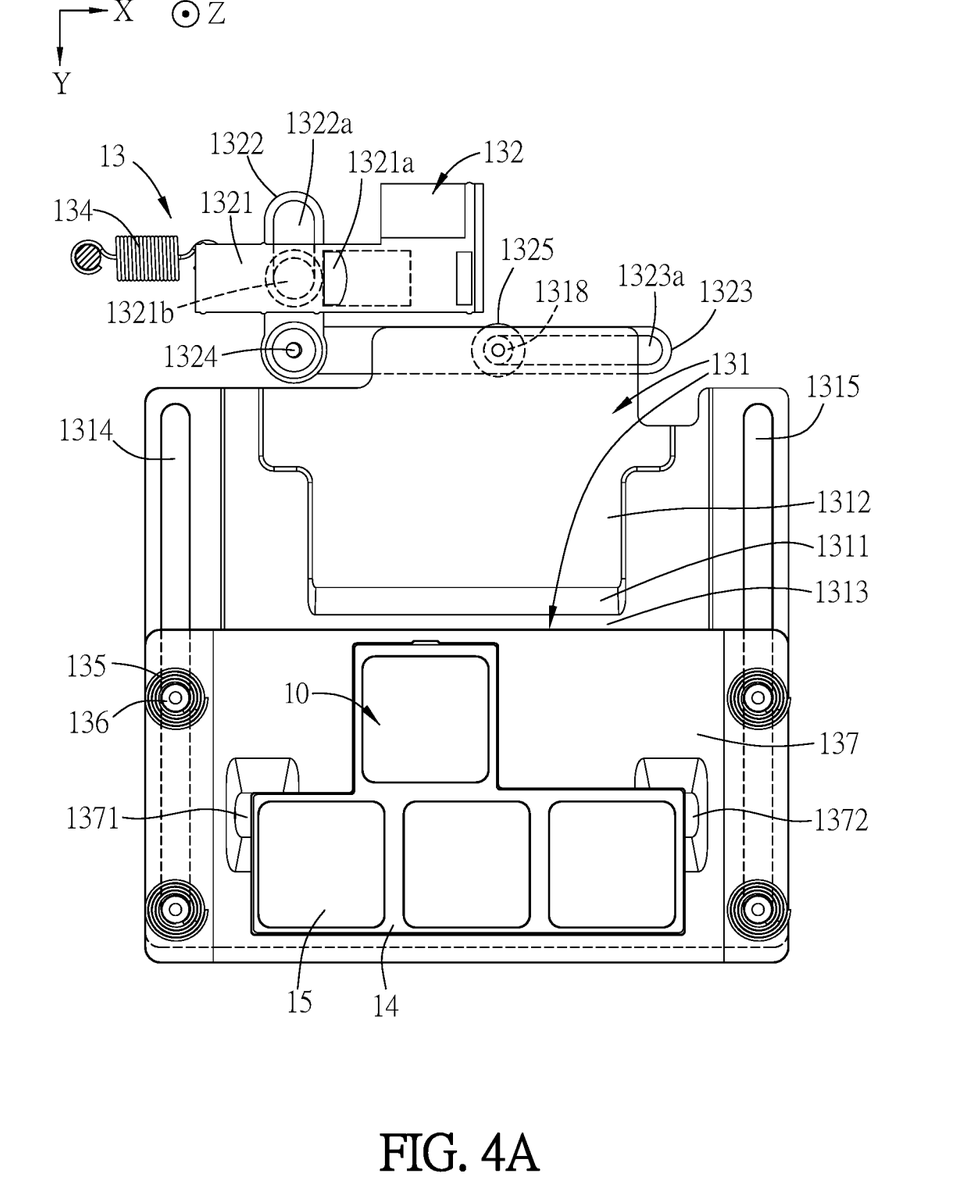
FIG. 4A and FIG. 4B are schematic diagrams of watching actuation of components of a keyboard along an axial direction Z in FIG. 1B.
Figure 4B:
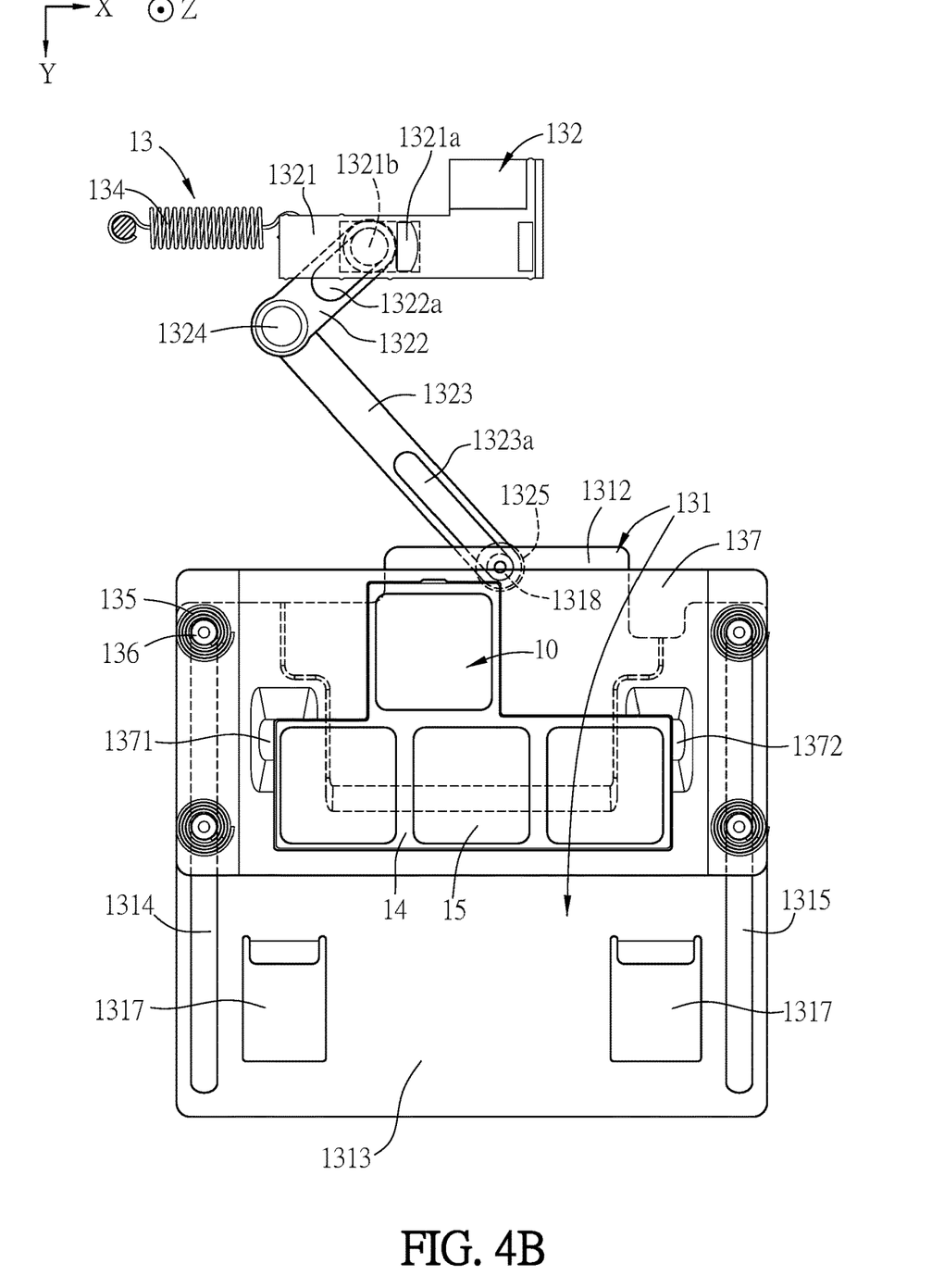

FIG. 4A and FIG. 4B are schematic diagrams of watching actuation of components of a keyboard along an axial direction Z in FIG. 1B. FIG. 5A to FIG. 5D are schematic diagrams of watching actuation of components of a keyboard along an axial direction X in FIG. 1B. Adjustment of the height of the input assembly 10 is described below based on FIG. 4A and FIG. 4B and FIG. 5A to FIG. 5D.

Figure 5A:
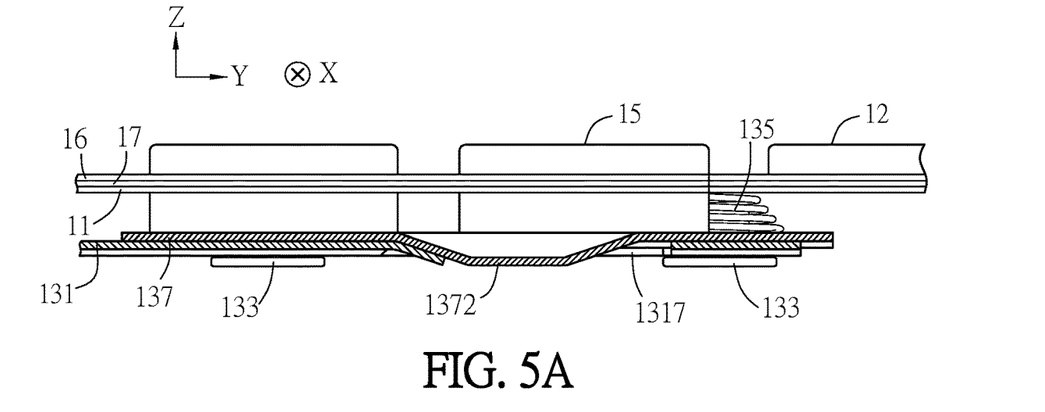
FIG. 5A to FIG. 5D are schematic diagrams of watching actuation of components of a keyboard along an axial direction X in FIG. 1B.

As shown in FIG. 4A and FIG. 5A, the input assembly 10 is not lifted up from the first location, the input rod 1321 does not move towards a positive axis of the axial direction X, the height of the key assembly 15 is the same as that of the key 12, the lower protruding portions 1371 and 1372 are located in the notches 1316 and 1317, and the elastic component 135 is not compressed to deform.

Figure 5B:
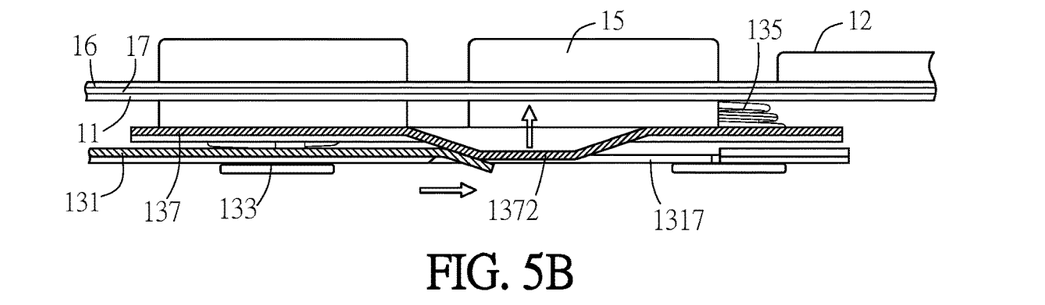

As shown in FIG. 5B, after the input rod 1321 moves towards the positive axis of the axial direction X, the wedge-shaped bevel 1311 moves towards the input assembly 10 on the positive axis of the axial direction Y along the slot direction of the guide slot 1314 or 1315, the lower protruding portions 1371 and 1372 depart from the notches 1316 and 1317, the wedge-shaped bevel 1311 has not abutted against the base 137, but the lower protruding portions 1371 and 1372 abut towards the base portion 1313 of the supporting base 131, and therefore the base 137 is blocked up, so that the base 137 moves towards the forward direction of the axial direction Z, and the key assembly 15 starts to be higher than the keys 12.

Figure 5C:
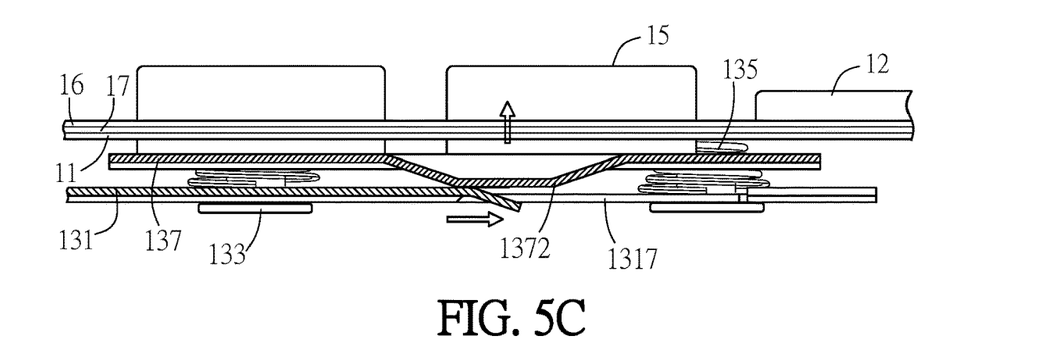

Then as shown in FIG. 5C, in this case, the input rod 1321 still continues to move towards the positive axis of the axial direction X, the wedge-shaped bevel 1311 continues to move towards the input assembly 10 on the positive axis of the axial direction Y along the slot direction of the guide slot 1314 or 1315, the input assembly 10 slides to the protruding portion 1312 along the wedge-shaped bevel 1311, the key assembly 15 is higher than the keys 12, and the elastic component 135 has been compressed to deform.

Figure 5D:
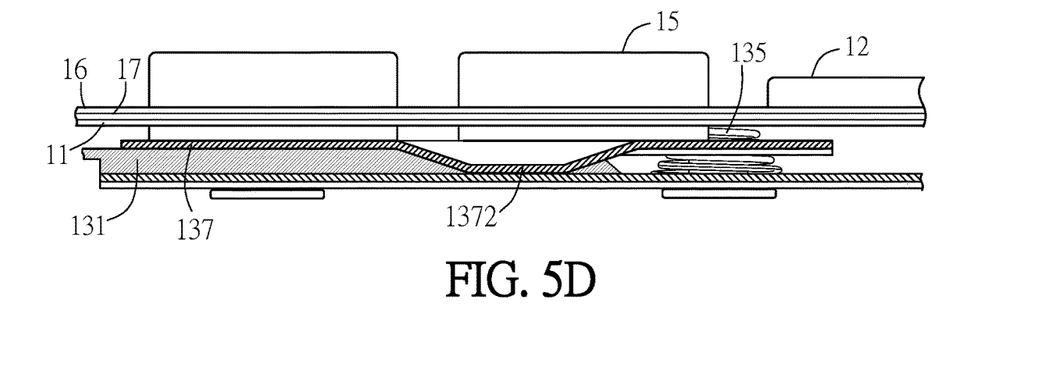

As shown in FIG. 4B and FIG. 5D, the input rod 1321 has reached an end of an open slot of the upper cover 24, and cannot continue to move towards the positive axis of the axial direction X; the input assembly 10 is lifted up to the second location; the key assembly 15 is higher than the keys 12; the protruding portion 1312 completely extends below of the base 137, to stably lift up the input assembly 10.

In this embodiment, after being pushed to the end of the open slot, the input rod 1321 may be fixed and does not move; the fixing manner, for example, is being clamped or fastened by a protruding object, or being hooked or fastened by a hook-shaped object, or another temporary fixing manner, so as to fix the height of the input assembly 10. When the input rod 1321 is pushed towards the negative axis of the axial direction X to return to the original location, the input assembly 10 can be lowered down. In addition, components in FIG. 4A and FIG. 4B and FIG. 5A to FIG. 5D actuate in a sequence opposite to that in the foregoing. In the descending process, elastic potential energy stored in the elastic component 135 is released and pushes the base 137 downwards, and helps the input assembly 10 descend to a location at which the input assembly is not lifted up.

Figure 6:
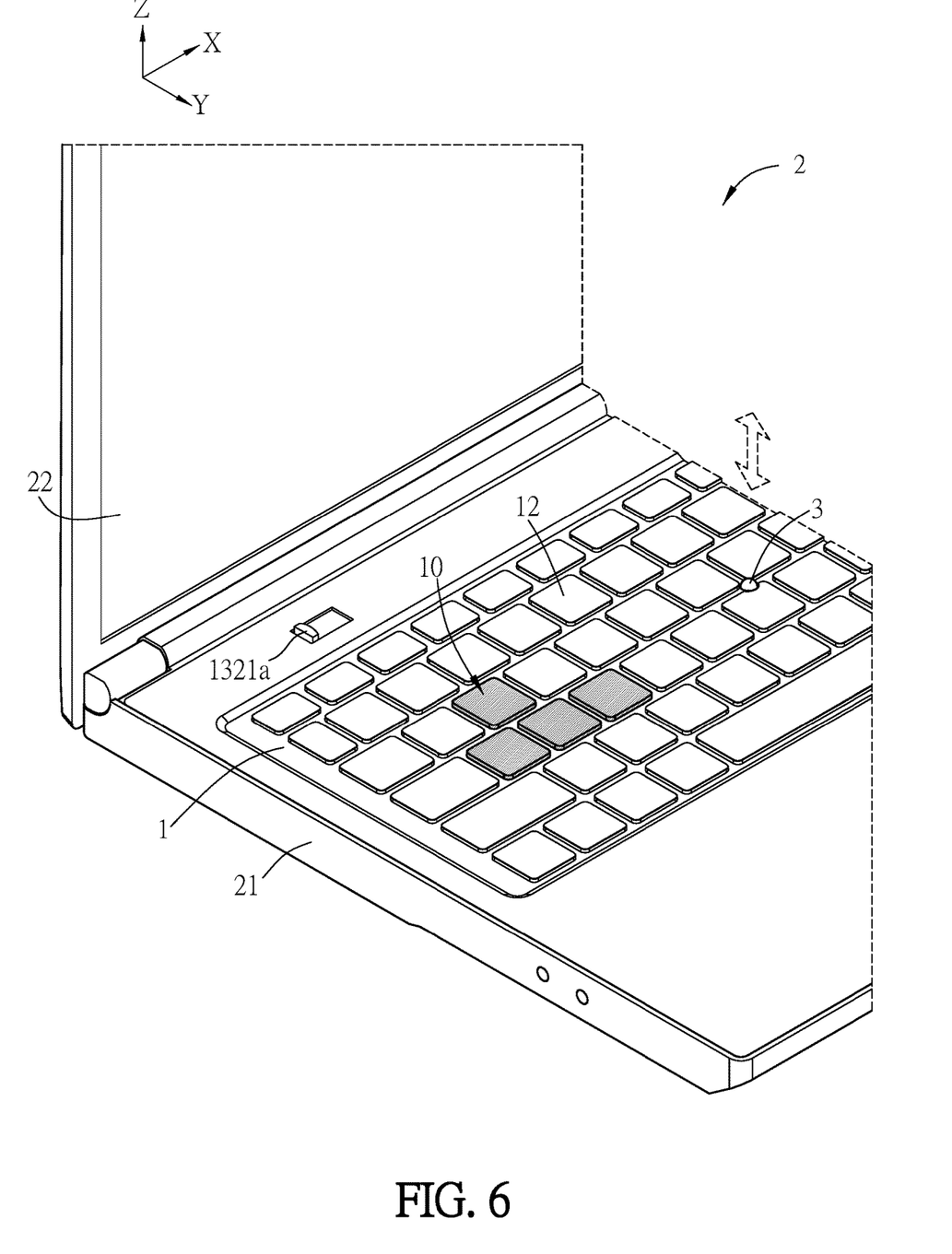
FIG. 6 is a schematic diagram of an electronic device according to an embodiment.

FIG. 6 is a schematic diagram of an electronic device according to an embodiment. As shown in FIG. 6, the electronic device 2 may include another input assembly 3 (briefly referred to as an input assembly 3 below); the input assembly 3 is a trackball, and the height may also be adjusted in the setting manner of the input assembly 10.

Figure 7:
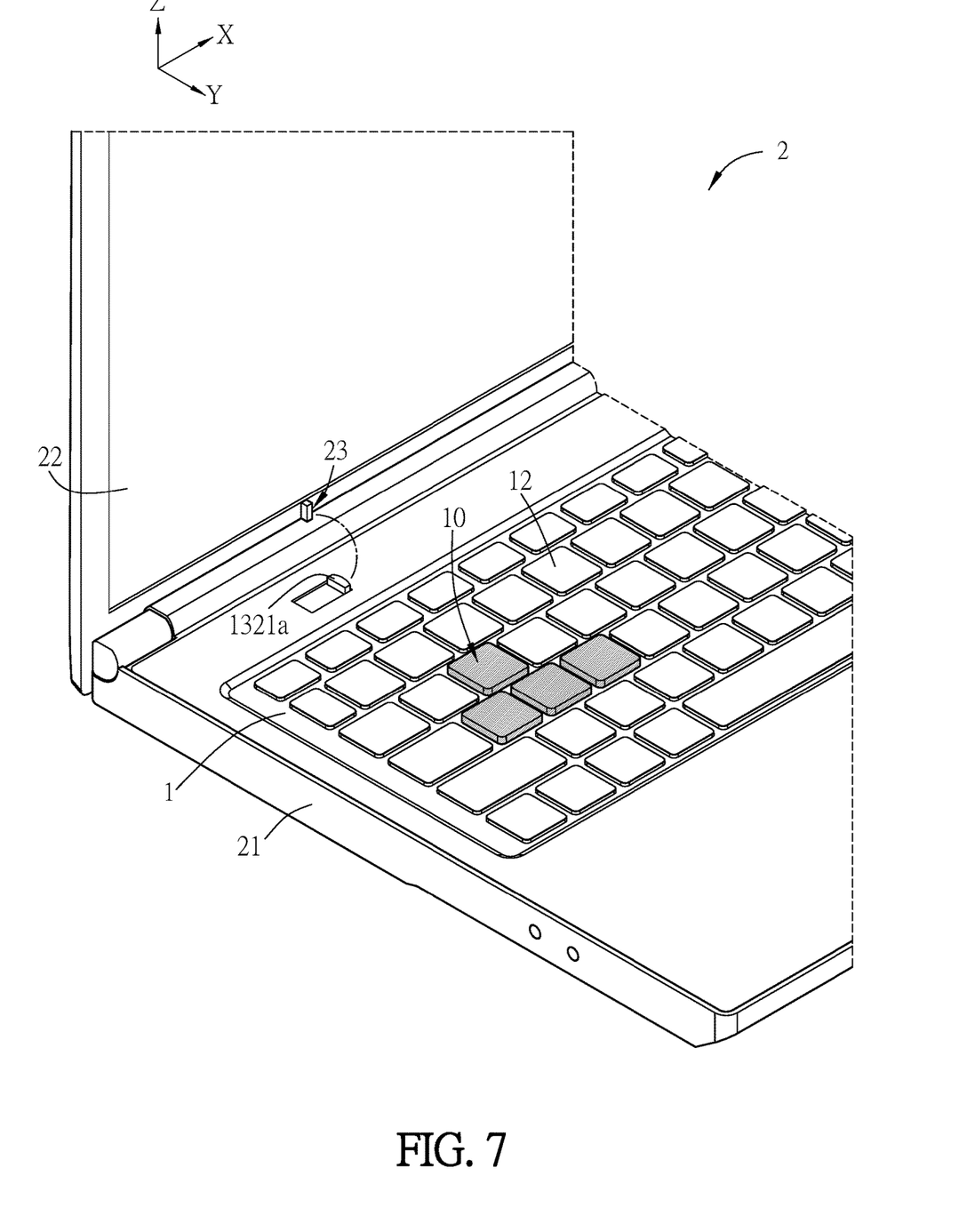
FIG. 7 is a schematic diagram of an electronic device according to an embodiment.

FIG. 7 is a schematic diagram of an electronic device according to an embodiment. As shown in FIG. 7, the electronic device 2 further includes a closure descending member 23, disposed on a display 22. When the display 22 pivots to a preset angle towards the housing 21, the closure descending member 23 drives the lifting device 13 to move and lower down the input assembly 10, thereby preventing the lifted input assembly 10 from bumping into the display 22 and causing damages.

For example, the closure descending member 23 is a magnet, and the lifting device 13 has a magnetic material that magnetically repels the closure descending member. For example, another magnet is added on the end of the protruding portion of the input rod 1321 of the lifting device 13. The magnet of the closure descending member 23 is located at a location, corresponding to the end location of the lifting device 13, on the display 22. When a closure angle between the display 22 and the housing 21 is less than a particular angle, for example, but not limited to an angle of 20 degrees, or another angle less than 20 degrees and greater than 0 degrees, the input rod 1321 is driven by a magnetic force to depart from a temporarily fixed state, for example, depart from a clamped state, a hooked state, or a fastened state by using a principle that like poles of the two magnets repel each other. Then the elastic member 134 is used to return the input rod 1321 from the end location to the initial location, thereby lowering down the input assembly 10.

Even if a user directly closes the display, the closure descending member 23 removes the temporarily fixed state of the lifting device 13 at the end location, and returns from the end location to the initial location by using a returning mechanism of the lifting device 13, thereby lowering down the lifted input assembly 10.

Based on the above, the keyboard and the electronic device of the application include a height-adjustable input assembly. A user can operate the lifting device to lift up the input assembly, so that the input assembly is higher than other keys, and the user does not need to move eyes to the keyboard, and can correctly find the location of the input assembly by using touch feelings of fingers. During a game application, the user does not need to distract and temperately move eyes from the display to the keyboard, and therefore can concentrate on the game as much as possible.

For example, the key assembly of the input assembly is WASD keys, and these keys are special function keys of computer games, and are usually main function keys; the WASD keys higher than other keys facilitate user operation and are operated more smoothly in computer games.

In addition, a user may operate the lifting device, to lower down the height-adjustable input assembly or make the height of the input assembly as high as other keys. For example, the key assembly of the input assembly is WASD keys, and WASD keys as high as other keys make it convenient for a user to type, and the entire keyboard can be used as a common keyboard.

The foregoing is merely examples, and is not intended to become a limitation. Any equivalent modification or change made to the application without departing from the spirit and scope of the application should fall within the appended claims of this application.

What is claimed is:

1. A lifting device, applied to an input assembly, the lifting device comprising:
   a base, bearing the input assembly and comprising a lower protruding portion;
   a supporting base, movably disposed corresponding to the base, wherein the supporting base comprises a base portion and a notch, and the notch is disposed corresponding to the lower protruding portion; and
   a connecting rod mechanism, comprising:
   an output rod, connected to the supporting base; and
   an input rod, linked with the output rod, wherein the input rod drives the output rod to move, so that the supporting base moves relative to the base, and when movement of the supporting base makes the lower protruding portion move from the notch to the base portion, the base ascends by a height.

2. The lifting device according to claim 1, wherein the input rod moves along a first direction, the supporting base moves along a second direction, and the first direction and the second direction are in a same plane and are perpendicular to each other.

3. The lifting device according to claim 1, wherein the supporting base further comprises:
   a protruding portion, wherein when movement of the supporting base makes the lower protruding portion leave away from the notch, the protruding portion overlaps with an orthogonal projection of the base for the supporting base to support the base.

4. The lifting device according to claim 3, wherein the supporting base further comprises:
   at least one guide slot, wherein a slot direction of the guide slot is the same as a movement direction of the supporting base.

5. The lifting device according to claim 4, further comprising:
   at least one fixing component, wherein one end of the at least one fixing component passes through the guide slot from one side of the guide slot; and
   at least one lifting-lowering guide member, mounted on the base and sleeved over the fixing member on the other side of the guide slot, wherein the at least one lifting-lowering guide member ascends with the base along an axial direction of the fixing component.

6. The lifting device according to claim 5, further comprising:
   at least one elastic component, sleeved over the lifting-lowering guide member, and compressed along the axial direction of the fixing component when the base ascends.

7. The lifting device according to claim 1, wherein the connecting rod mechanism further comprises:
   a connection rod, pivotally connected to the output rod and having a first chute, wherein the input rod has a pivot shaft, and the pivot shaft of the input rod is slidably disposed on the first chute.

8. The lifting device according to claim 1, wherein the output rod has a second chute, the supporting base has a pivot shaft, and the pivot shaft of the supporting base is slidably disposed on the second chute of the output rod.

9. A keyboard, comprising:
   a first circuit board, having an opening;
   a input assembly, wherein at least one part of the input assembly passs through the opening; and
   the lifting device according to claim 1, to lift up the input assembly.

10. The keyboard according to claim 9, wherein the input assembly comprises:
    a second circuit board, disposed below the first circuit board; and
    at least one key assembly, disposed on the second circuit board and passing through the opening, wherein a profile of the opening conforms to a profile of the key assembly.

11. The keyboard according to claim 10, further comprising:
    a plurality of keys, disposed on the first circuit board, wherein a cap height of a keycap of the key assembly is greater than a cap height of keycaps of the keys, and when the notch of the supporting base accommodates the lower protruding portion, a height of a keycap top of the key assembly is the same as a height of keycap tops of the keys.

12. An electronic device, comprising:
    a housing; and
    the keyboard according to claim 9, disposed on the housing.

13. The electronic device according to claim 12, wherein the electronic device is a notebook computer, and further comprises:
    a display, pivotally disposed on the housing; and
    a closure descending member, disposed on the display, wherein when the display pivots to a preset angle towards the housing, the closure descending member drives the lifting device to move and descend the input assembly.

* * * * *